United States Patent
Isaac et al.

(10) Patent No.: US 8,730,818 B2
(45) Date of Patent: May 20, 2014

(54) CONVERTER/MULTIPLEXER FOR SERIAL BUS

(75) Inventors: Emad S. Isaac, Downers Grove, IL (US); Jeff A. Champa, Bolingbrook, IL (US)

(73) Assignee: The Morey Corporation, Woodridge, IL (US)

( * ) Notice: Subject to any disclaimer, the term of this patent is extended or adjusted under 35 U.S.C. 154(b) by 560 days.

(21) Appl. No.: 12/761,559

(22) Filed: Apr. 16, 2010

(65) Prior Publication Data
US 2011/0255411 A1 Oct. 20, 2011

(51) Int. Cl.
*G01R 31/08* (2006.01)

(52) U.S. Cl.
USPC ........................................................ 370/241

(58) Field of Classification Search
None
See application file for complete search history.

(56) References Cited

U.S. PATENT DOCUMENTS

| | | | |
|---|---|---|---|
| 4,528,662 A | 7/1985 | Floyd et al. | |
| 7,933,998 B2 * | 4/2011 | Anderson et al. | 709/227 |
| 8,126,642 B2 * | 2/2012 | Trepagnier et al. | 701/423 |
| 2003/0128142 A1 | 7/2003 | Khalil et al. | |
| 2004/0013097 A1 | 1/2004 | Massa | |
| 2006/0041349 A1 * | 2/2006 | Chinnadurai et al. | 701/35 |
| 2006/0142061 A1 * | 6/2006 | Steffan | 455/557 |

FOREIGN PATENT DOCUMENTS

WO  2005-067409  7/2005

OTHER PUBLICATIONS

International Search Report and Written Opinion of PCT/US2011/032007 dated Jan. 2, 2012.

* cited by examiner

*Primary Examiner* — Chi Pham
*Assistant Examiner* — Kouroush Mohebbi
(74) *Attorney, Agent, or Firm* — Vedder Price PC

(57) ABSTRACT

This disclosure relates to a converter/multiplexer and associated method of use therefor or converting and multiplexing parallel inputs, a modem, a GPS, or even modem information into a single multimaster broadcast serial bus standard for connecting electronic control units, and more specifically, to a multiplexer for transforming analog, digital, frequency, GPS, or modem inputs into a CAN bus data transmittal over LAN and/or PAN and interrelation with a similarly equipped receiving module. Further, the converter/multiplexer is used alone or in a group as part of a larger system for multiplexing and demultiplexing signals for serial bus processing and also for guidance when the converters are cabled by operators using stored configurations.

9 Claims, 5 Drawing Sheets

CONVERTER/MULTIPLEXER FOR SERIAL BUS

FIELD OF THE DISCLOSURE

This disclosure relates to a converter/multiplexer and associated method of use therefor for converting and multiplexing parallel inputs, a modem, a GPS device, or even modem information into a single multimaster broadcast serial bus standard for connecting electronic control units, and more specifically, to a multiplexer for transforming analog, digital, frequency, GPS, or modem inputs into a CAN-bus, data transmittal over LAN and/or PAN, and interrelation with a similarly equipped receiving module, or the transmission of a single serial signal over a cable specifically designed for serial signals.

BACKGROUND

Instrumentation, control, and actuating devices such as sensors, actuators, control devices, electrical motors, etc. are often sold with some level of onboard software/hardware to provide a high level of regulation and control of the device. This is a consequence of the miniaturization and the cost reduction of electronic equipment. Equipment that was once sold having simple on/off analog inputs is often replaced by new technology with built-in intelligence, regulation, control, and calibration.

As a result, in recent devices built by manufacturers, there is trend toward the increase in the number and frequency of control, regulation, and monitoring points to help create overall systems that can be easily operated, maintained, and regulated. Instrumentation that was once used in complex devices has now spread to more basic equipment and has even become widespread in larger, integrated systems such as assembly lines, manufacturing plants, inventory tracking systems, shipping operations, vehicles, and the like. For example, motors were once controlled using power inlets. External sensors were then needed to monitor the speed of the motor and determine the effectiveness of the motor using reverse calculation. New motors are now sold with onboard sensory equipment that can determine heating, rotational speed, relative position of the rotor/stator units, etc. Taking full advantage of this useful data is often complex. The flow of data returning from the motor requires analysis in real time, cabling to a processor, and a human interface for monitoring of the information.

FIG. 1 taken from the prior art illustrates how a central processor placed on any single system/device can be connected to individual sensor, actuator, control device, or electrical motor. Each element on the right side of this figure sends a continuous stream or a frequency-based stream of data received in parallel process by the processing device. For example, in a car, the processing device may be a central processing unit placed conveniently next to the dashboard for access by a technician. Individual cables must be drawn from each individual point of measure to the processing device in bundles. Highly computerized automotive engines now have bundles of rear sensor cables running along the frame of the vehicle to the processing device. Electromagnetic interference on these long cables can have a disastrous effect on reported measurements. Further, in case of an accident, damage to these cables can result in excessive repair costs. What is needed is a new device, system, and method of use to reduce the need for these connecting cables between the single processor and the different sensors, actuators, control devices, and electrical motors.

Further, with the arrival of low-power, low-cost, wireless transmitters, electronic messages can now be sent wirelessly over short distances or over long distances using modem technology, Global Positioning Technology, or even telecommunication systems such as other positioning system like the Gallileo system. Within the scope of this disclosure, the term GPS shall be construed broadly to include any positioning system including all satellite location based systems. In some cases, for example in a semi truck, a removable trailer that may require instrumentation to be connected to a processing device located on the engine located in the front of the truck. Currently, large, multiwire connectors are used to connect each individual measuring instrument as shown in FIG. 1. What is needed is a wireless system adapted for separable equipment for the management of reduced-size connecting cables. The system must also not be vulnerable to interference with surrounding elements often creating electromagnetic interference. What is also needed is the transformation of multiple signals over a single wire or an optical cable such as for example an Ethernet over twisted pair cable to relay the serial information.

Finally, with the increase in the number of wires, large connectors must be used. These connectors are fragile, vulnerable to weather conditions, and must be hand cabled. What is needed is a system for removing at least a portion of these cables while being capable of intelligently recognizing the different input configurations to offer self-monitoring and self-cabling capacities.

SUMMARY

This disclosure relates to a converter/multiplexer, and associated method of use therefor for converting and multiplexing parallel inputs, a modem, a GPS, or even modem information into a single multimaster broadcast serial bus standard for connecting electronic control units, and more specifically, to a multiplexer for transforming analog, digital, frequency, GPS, or modem inputs into a CAN-bus, data transmittal over LAN and/or PAN, and interrelation with a similarly equipped receiving module. Further, the converter/multiplexer is used alone or in a group as part of a larger system for multiplexing and demultiplexing signals for serial bus processing and also for guidance when the converters are cabled by operators using stored configurations.

BRIEF DESCRIPTION OF THE DRAWINGS

Certain embodiments are shown in the drawings. However, it is understood that the present disclosure is not limited to the arrangements and instrumentality shown in the attached drawings, wherein.

DETAILED DESCRIPTION

Figure 1:
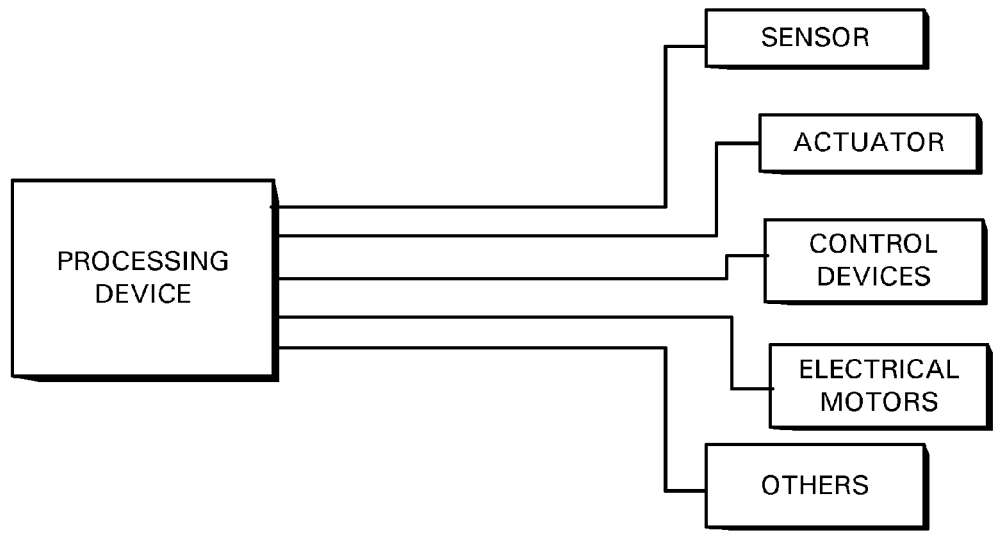
FIG. 1 is a cabling configuration of a telematics processing device with a plurality of sensory devices used as telematics taken from the prior art.

For the purposes of promoting and understanding the principles disclosed herein, reference will now be made to the preferred embodiments illustrated in the drawings and specific language will be used to describe the same. It is nevertheless understood that no limitation of the scope is thereby intended. Such alterations and further modifications in the illustrated device and such further applications of the principles disclosed as illustrated therein are contemplated as would normally occur to one skilled in the art to which this disclosure relates.

BUS Technology

Data bus communication systems are used frequently in many industries with electronic instrumentation. They serve as interfaces systems for data where industrial processes and control systems are needed between different equipment operating at different nodes/branches in a system. For example, the process control industry requires the communication of data between multiple sensors, control elements, etc. Within the scope of this disclosure, the term "instrumentation" is to be read to include, in addition to any meaning normally given in the art, sensors, actuators, control devices, electrical motors, and any other equipment capable of holding onboard electronics that must be regularly maintained, monitored, regulated, or controlled.

The term "bus" meant at one time an electrically parallel system made with electrical conductors. Modern systems have merged the concept of "buses" with "networks" where, as part of this disclosure, the term "bus" may be understood generally to mean both the hardwire system and the communication network. Buses can be parallel buses, which carry data in parallel on multiple wires, or serial buses, which carry data in bit-serial form. The current disclosure relates generally to serial bus technology.

Some types of serial buses include the Universal Serial Bus (USB), the Serial Attached SCSI bus, the serial ATA, the Controller Area Network bus ("CAN bus"), the EIA-485 bus, and more recently, the FireWire bus. While the current disclosures focuses mostly around one type of bus, namely, the CAN bus, as one possible contemplated embodiment is in the automotive industry where the use of the CAN bus is prevalent, the disclosure and claims apply to any and all known and future types of buses.

There are different types of data communicated over data buses. The "non-real-time" data is often associated with non-critical data that can be communicated from the instrumentation, such as, for example, an ID number. "Real-time" data, on the other hand, is time sensitive and must be retrieved or the data is lost. For example, if a sensor measures a temperature, this value fluctuates over time and is eclipsed by new temperature measurements. Sometimes, a single piece of instrument can generate multiple data signals for the purpose of local control or transmission to a control system. In addition, instrumentation can generate both non-real-time data and real-time data. Telematics is often associated with non-real-time data, and therefore, while most of this disclosure may seem directed to non-real-time data, what is contemplated is the use of the disclosed technology for any type of data transmitted by instrumentation or other equipment. For example, real-time-data of a sensor capable of measuring an analog value of temperature can be made digital with a more frequent time measurement. For example, the outside temperature sensor of a car, while capable of measuring the temperature continuously, can instead be queried every second or minute in a non-real-time fashion. Non-real-time data is often of lower priority because the signal accuracy or performance is not degraded when the information is buffered and stored temporarily before transmitted over the bus.

There are two principal types of bus communication protocols. In the Carrier-Sense Multiple Access ("CSMA") protocol, each node on the bus (i.e., each piece of instrumentation) senses traffic and waits for traffic to clear before sending its data. The second type of bus protocol is the Time Division Multiple Access ("TDMA"). In this protocol, each node on the bus is allotted a time slot in which to transmit and receive its messages. The CAN bus protocol is generally categorized under the CSMA family. Arbitration is used to determine when messages can be sent. Once again, while one type of protocol technology is shown, the current disclosure relates to any type of bus protocol as long as the technology is compatible with the teachings of the current invention.

CAN Technology

Controller-Area Network (CAN or CAN-bus) is a bus standard designed to allow microcontrollers and devices to communicate with each other as part of an onboard system without a host computer. CAN is a message-based protocol use in automotive, industrial automation, and even medical equipment applications. CAN is only one of several protocols used by the OBD-II vehicle diagnostics standard, and therefore, while the current disclosure focuses on the description of a novel equipment used with a CAN-bus based system and device, one of ordinary skill in the art will recognize that the disclosure is not limited to any particular communications protocol.

Equipment, sensors, and other data sources such as instrumentation at each of a plurality of nodes produce constant analog, digital, or even frequency raw data to be read by the processing system connected to the equipment. In sum, the data sent by a multitude of sensors reaches a system in parallel. CAN is a multimaster broadcast serial bus standard for connecting electronic control units (ECUs). Serial bus standards are not equipped to decipher data from multiple nodes simultaneously, but with the constant increase of processing speeds, a serial system can be rapid enough to tend serially to a plurality of incoming raw data streams as long as the streams are buffered and managed.

Figure 3:
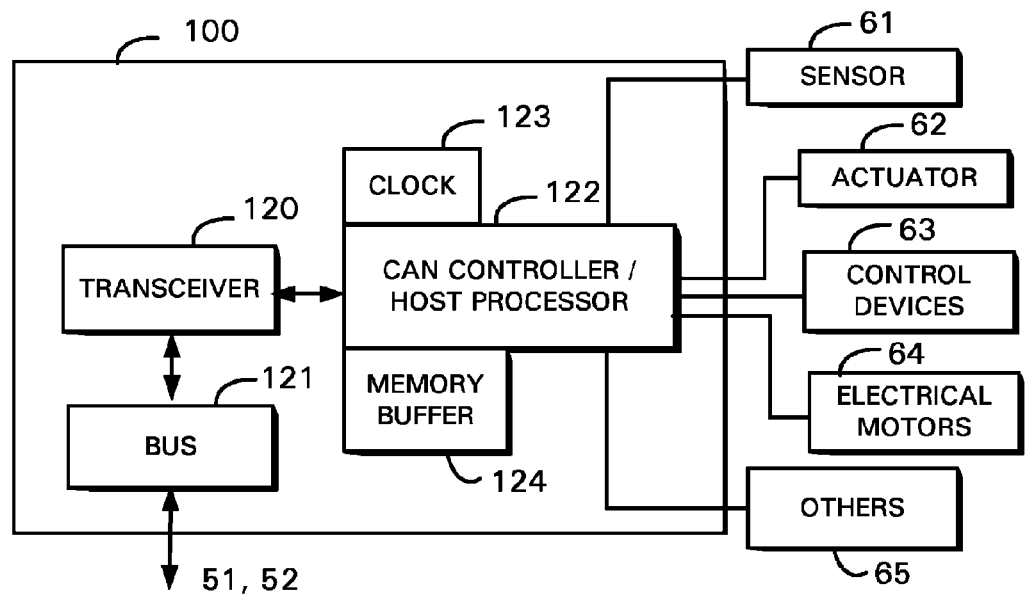
FIG. 3 is a block diagram of possible internal elements of the remote control device as shown in FIG. 2 according to an embodiment of the present disclosure.

In the CAN bus, a message consists primarily of an ID, normally up to eight data bytes transmitted serially onto the bus using an encoded NRZ pattern (i.e., Non-Return to Zero) followed by data to be sent. In recent versions of the CAN protocol, for example, the CAN 2.0A, the identifier is 11 bits long, and under the new CAN 2.0B, the identifier can be up to 29 bits long. Under the CAN protocol, measuring devices are not connected directly into a CAN network but are sent through a host processor and a CAN controller. A dominance system allows the CAN bus to regulate the incoming flow of information from the measuring devices. For any node to operate, as shown in FIG. 3, the node must include a host processor 122 to decide what message is received and to establish data communication with the different sensors, actuators, and control devices 61, 62, 63, 64, and 65. The node must further include a CAN controller 122 with a synchronous clock 123 for receiving bits serially from the bus until an entire message is available, which is then fetched by the host processor 122, often after the CAN controller 122 has issued an interrupt message.

Further, the CAN controller 122 stores in memory buffer the message and then transmits it serially to the bus 121 via a transceiver 120, which is often integrated with the CAN controller 122 for adapting signal levels from the bus 121 to the CAN controller 122 and further adapting the level of the signals sent back into the bus 121. Standards known to be applicable to the CAN Physical layers include but are not limited to the ISO 11898, ISO 11992, ISO 11783, SAE J1939-11, SAE J1939-15, and the SAW J2411. While FIG. 3 shows one possible parallel-to-serial CAN bus, any bus technology directed to multimaster broadcast serial bus standards is contemplated.

Field buses like the CAN bus can be used under the IEC 61158 industrial computer network framework, including protocols used for real-time distributed control that include a human machine interface (HMI), connected via Ethernet or other network to a Programmable Logic Computer (PLC) and in turn connected to the field bus.

Converter/Multiplexer Technology

A multiplexer is a device that generally performs multiplexing, i.e., it selects one of many inputs, either analog, digital, or another, and forwards the selected input into a single line. Multiplexers make it possible for a plurality of signals to share one common resource. On the receiving end, a demultiplexer is generally used, this device is a mirror image of the multiplexer used to merge parallel signals into a common serial signal. Converters, on the other hand, are used to transform an input into a different type of output. For example, an analog-to-digital converter transforms an analog input into a digital output without changing the nature of the input aside from any signal degradation as a result of the conversion.

As part of this disclosure, the device shown takes a plurality of inputs and multiplexes them into a single serial output. The device also converts the signals to a serial bus protocol from the original source type, such as the CAN bus protocol from an analog input, and therefore can be referred to as a converter. While the term "converter/multiplexer" is used generally to describe the device used to alter input signals, one of ordinary skill in the art recognizes that signal processing is not limited to conversion or multiplexing, alone or in combination, but is used as part of a larger set of operations made on input signals. These two signal processing types do not exclude other types of pre- or post-processing, the use of multiple devices, or the use of different steps that may result in similar end results.

Transceivers

As part of one possible embodiment, described hereinafter, a plurality of transceivers is used as part of different components of the controller/multiplexer 1 as shown in FIG. 1. The term "transceiver" generally related to a device that has a combined transmitter and receiver designed to share common circuitry and/or a single housing. Transceivers include, for example, transponders, transverters, and repeaters.

For example, a MAX3223 Transceiver is contemplated as one of the transceivers used in the controller/multiplexer 1. The MAX3223 is a MAXIM® RS-232 Transceiver with 1µ Supply-Current, True +3V to +5.5C with auto shutdown. This transceiver has a regulated dual-charge pump that provides +5.5V regardless of input voltage over the +3.0V to +5.5V range. The transmitters are inverting-level translators that convert CMOS-logic levels to 5.0C EIA/TIA-232 levels. The receivers convert RS-232 signals to CMOS-logic output levels. The MAX3100 Transceiver is also contemplated as another transceivers of the controller/multiplexer 1. The MAX3100 is a MAXIM® Universal Asynchronous Receiver Transmitter (UART) optimized for small, microcontroller-based systems. Finally, the MC13192, a Transceiver from Freescale Semiconductor®, is contemplated as the CAN-bus transceiver. This device is a 2.4 GHz Low-Power Transceiver for the IEEE 802.15.2 Standard and can be made to be ZigBee 2006 compliant. This transceiver is equipped for transmitting a serial output via a wireless protocol taken from a group consisting of a local area network protocol (LAN), a personal area network protocol (PAN), a low-power digital radio protocol (ZigBee), and an hypertext transfer protocol (HTTP). Finally, a CAN transceiver from NZP Semiconductors®, such as the PCA82C251, can be used as an interface between a CAN protocol controller and a physical bus. This transceiver is fully compatible with the ISO 11898-23V standard.

Physical Embodiments

Figure 2:
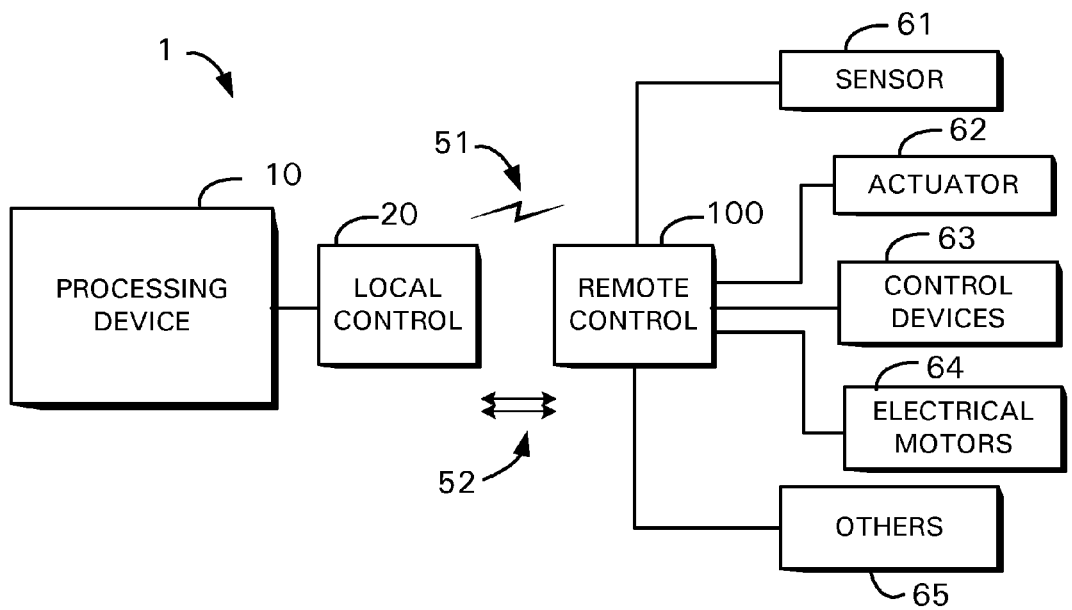
FIG. 2 is a block diagram of the converter/multiplexer of the current disclosure according to an embodiment of the present disclosure.

In contrast to FIG. 1, FIG. 2 illustrates how the remote control 100 and local control 20 dual-box technology can be used to replace the long wires used to connect the different instruments such as sensors 61, actuators 62, control devices 63, electrical motors 64, and other devices 65 to the processing device 10 as part of a converter/multiplexer for onboard equipment 1. Using a remote control 100, communication can be established either via hardwire lines 52 such as Ethernet over twisted-pair, an optical cable or wireless communication 51 to the local control 20, each being connected to a CAN bus in one contemplated embodiment. Once at the local control 20, the information can be sent to the processing device 10 either after a second subsequent change in format back to serial output (for a system capable of installation on existing systems) or for treatment in the new interface.

In one embodiment, the remote control unit 100 is a controller/multiplexer 1 system where inputs from different instruments (61, . . . 65) are changed into a CAN bus format and sent to a controller/demultiplexer 20 that mirrors the teachings described hereinafter. In another embodiment, the information is sent serially in a serial bus format via SNA, Ethernet, or via an optical cable or wireless for decoding back into a CAN-bus format. FIG. 3 is one possible configuration of the remote control unit 100 also described as a switchblade or a controller/multiplexer.

Figure 4:
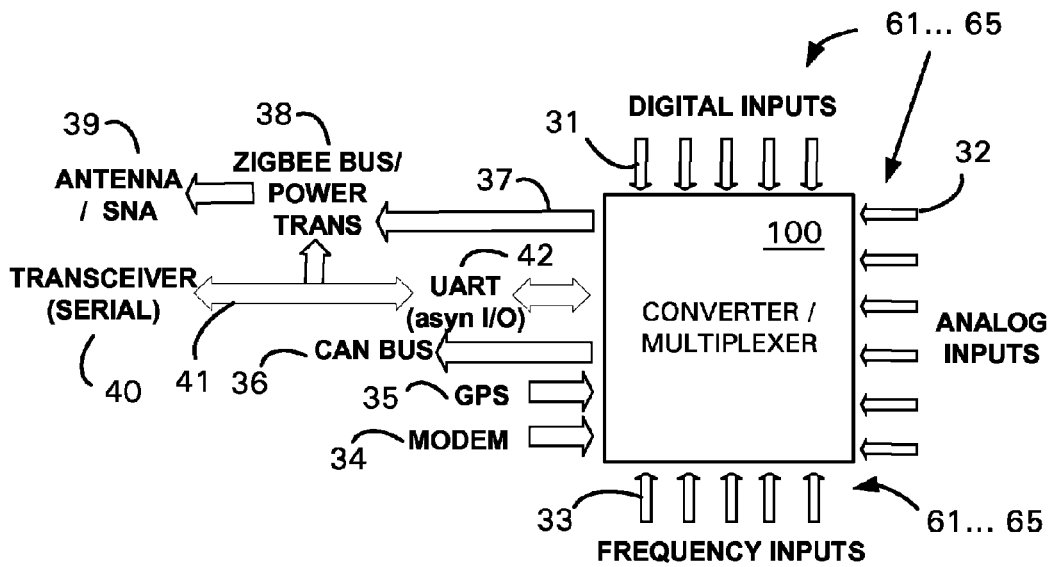
FIG. 4 is a connection diagram of the connector/multiplexer for the conversion inputs into different format of outputs according to another embodiment of the present disclosure.

A shown in FIG. 4, a group of analog inputs 32, in one embodiment eight analog inputs with an impedance of 50 k and a voltage of either 0-12V or 0-24V, are connected via an operational rail-to-rail low-power amplifier of 0-+3.3V to correct impedances as a unity gain buffer or follower amplifier. In one embodiment, a TLV2464 from Texas Instruments® is used. Sixteen digital inputs 31 each also with an impedance of 50 k and a voltage of either 0-12V or 0-24V are connected to the multiplexer 70 via a gain buffer. Frequency inputs, such as normalized frequency exchange signals, are also equally connected using an impedance of 50 k associated with an input voltage variation of 0-12V or 0-24V along with a gain buffer. While one type of input connections is described, the use of any input signal that can be processed into a serial signal is contemplated.

As further shown in FIG. 4, a Global Positioning Signal (GPS) input 35 or a MODEM input 34 are shown as possible inputs. These two sources of information, as well as all of the above listed inputs 31, 32, and 33, can be used as entry data or input control data to help control, enable, disable, or operate the controller/multiplexer 70. For example, a device such as a car to be serviced can be equipped with a GPS device to determine its location. Such a vehicle may not require two GPS locators, but while one is disclosed, what is contemplated is the use of any number and type of input as entry data to be processed by the multiplexer.

Three different outputs of the multiplexed information is provided via either a wireless antenna or SNA connector 39 with a first type of transformer 38 such as a ZigBee bus transformer, a simple transceiver serial 40 using a UART asynchronous I/O 42, or using a CAN bus transceiver 36. In one example, a small box includes a wide range of input devices on its external periphery. The device is placed locally, for example, near the back of a car, and local sensors and instrumentation of different types are plugged in the box. Based on the situation, the box can be programmed first to monitor what inputs are being plugged in to recognize based on a configuration the location or type of vehicle in which it is installed.

Once the data is converted and multiplexed, it can be sent to the front of the car to a second box using a single, long, serial SNA cable connected to the box, or the antenna can be enabled to broadcast the information to the second box. Finally, the CAN bus can be connected locally into a CAN interface used by the car system to operate. One of ordinary skill in the art recognizes how the use of boxes for multiplexing and converting can be used with or without the CAN function, or with or without the use of a portion of the devices in the box.

Figure 5:
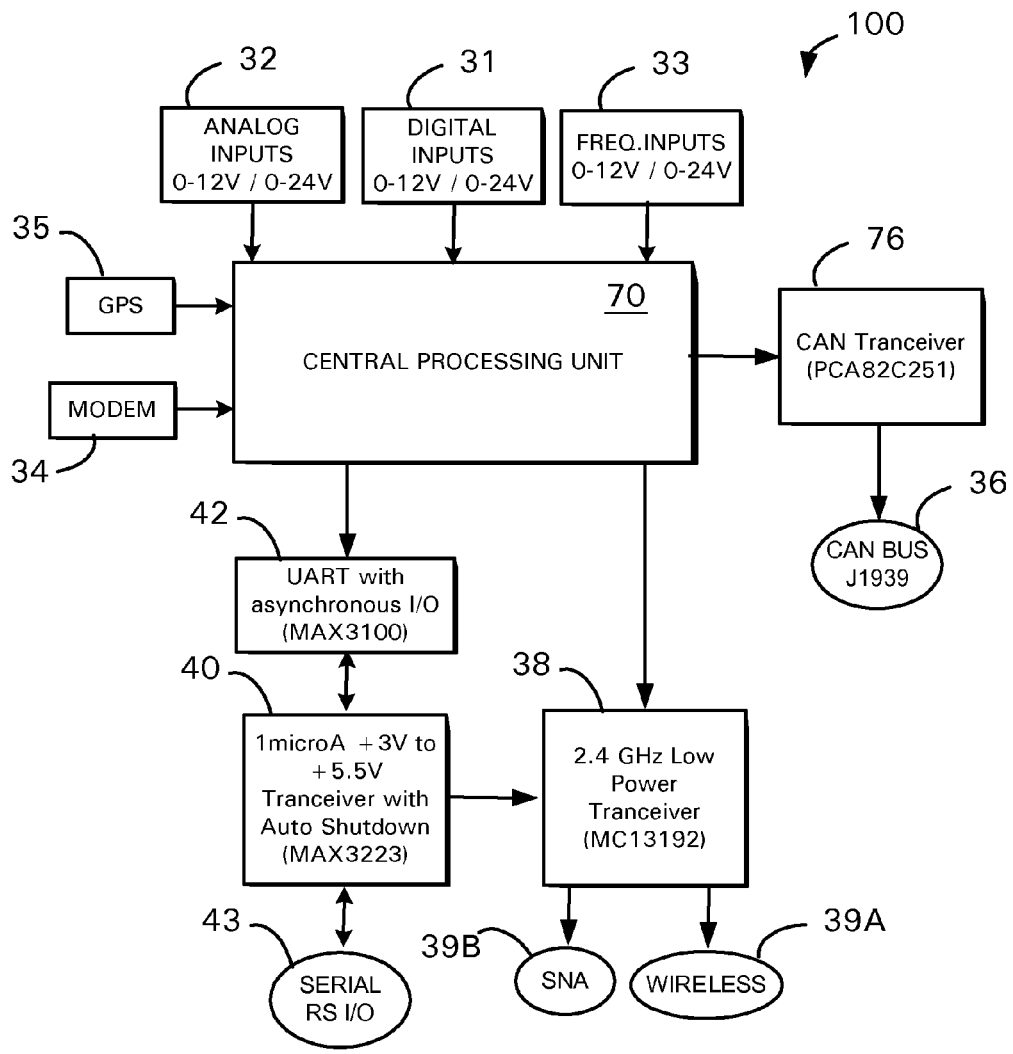
FIG. 5 is a functional diagram of the different elements connected to the multiplexer for the production of a standardized serial output according to an embodiment of the present disclosure.

In one embodiment, the converter for multiplexing 100 multiple inputs 61, 62, 63, 64, and 65 to a serial bus 121 includes a central processing unit such as a host processor 122 connected to at least two inputs 31, 32, 33, 34, and 35 for receiving parallel data from each of the at least two inputs and at least a first transceiver 120 connected to the central processing unit of the host processor 122 for merging the at least two serial inputs 31, 32, 33, 34, and 35 into a serial output format. The converter/multiplexer 100 further includes at least a second transceiver connected to the central processing unit 70 and to a serial bus 36 as shown in FIG. 5. The transceiver 76 is used to adapt a level of the serial output from the first transceiver 76 to the serial bus 36. While one embodiment is shown where the CAN transceiver is located on the converter/multiplexer 100, the use of the CAN transceiver only on the converter/demultiplexer at a receiving end where a first converter 100 sends via wireless or land lines 51, 52 in many different format, the information that can then be processed using the CAN transceiver 76 to a local CAN-bus 36 is contemplated.

The transceiver 120 as shown in FIG. 3 can be understood to be a pair of UART transceivers with microtransceivers 42, 40 as shown in FIG. 5. The transceiver 120 described as the first transceiver includes a message management system for storage in memory and stacking of messages based on a priority system. Several types of systems, including soft wire programming, can be used at the converter 100 to perform the same task at a different efficiency rate. For example, the different instrumentation 61, 62, 63, 64, 65, can be sampled at fixed intervals in a round-robin fashion to create a serial stream of data from what is non-real-time data.

The converter/multiplexer 100 can also include a third transceiver 38 for transmitting the serial output via a wireless protocol 39A, a local area network protocol (LAN), a personal area network protocol (PAN), a low-power digital radio protocol (ZigBee), and a hypertext transfer protocol (HTTP). Once again, while a handful of possible configurations is described, one of ordinary skill in the art will recognize with the arrival of new technology how to enhance the teachings described herein using new devices to help process a parallel stream down into a serial stream and convert a multiple-input device into a serial bus protocol.

In the embodiment shown in FIG. 5, the first transceiver 42, 40 is a first UART with asynchronous input/output connected serially with a microtransceiver with auto shutdown, the second transceiver 76 is a CAN transceiver, and the third transceiver 38 is a low-power transceiver. In yet another embodiment, the low-power transceiver 38 transmits the serial output over a high-level communication protocol using small, low-power digital radios based on the IEEE 802.15.4 standard.

More specifically, FIG. 5 illustrates a multiple-input converter 100 for transforming parallel inputs to a serial CAN-bus output sent to a CAN bus J1939 39, the converter 100 including a central processing unit 70 connected to at least two digital inputs 31 and two analog inputs 32 for receiving data from each of the inputs 31, 32. The converter 100 further includes at least a first UART 42 with asynchronous input/output connected serially with a microtransceiver 40 connected to the central processing unit 70 for merging the serial inputs 31, 32 into a serial output sent to a CAN transceiver 76 connected to the central processing unit 70 and to a CAN bus 36 to adapt a level of the serial output from the microtransceiver 40 to the CAN bus 36. The converter 100 also includes a low-power transceiver 38 for transmitting the serial output via a wireless protocol 39A or a protocol taken from a group consisting of a local area network (LAN) protocol, a personal area network (PAN) protocol, a low-power digital radio (ZigBee) protocol, and an hypertext transfer (HTTP) protocol.

What is described is the interconnection of a plurality of small, portable, electronic devices to form a device capable of being placed in vicinity of different instrumentation (61, ... 65) to process parallel real-time and non-real-time data into a stream of serial data that can be sent directly or indirectly to a bus like the CAN bus or other types of localized protocol of communication. With the miniaturization and the arrival of more advanced microprocessors, many of the different functions performed by the electronic equipment will be merged or displaced from one element to the next, including, for example, instrumentation (61, ... 65) can be made to include transceiver-like functions for emission and process of the data. In addition, software layers at a low level 2 or other levels can be programmed into the processing unit 70 to substitute for many of the functions currently described in the first, second, or even third transceivers. One of ordinary skill in the art will recognize that while one onboard equipment 1 is shown, other configurations are also contemplated.

Use of the Embodiments

Figure 6:
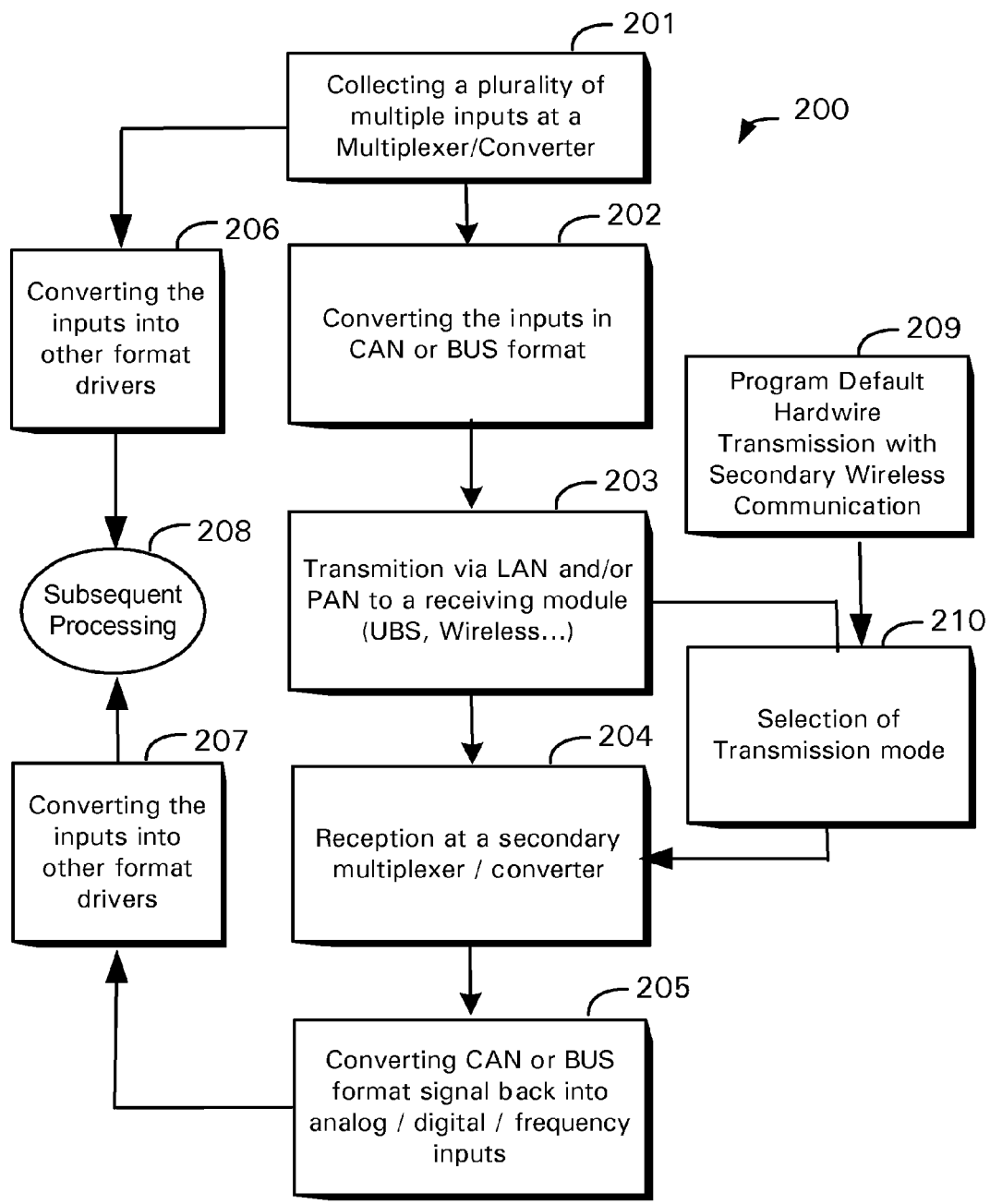
FIG. 6 is a method for converting inputs into a standardized serial output for transmission to a receiving module according to an embodiment of the present disclosure.

The above-described embodiments serves a useful purpose. In addition to allowing for connection cables to be shortened by using a local converter/multiplexer 100, the device, when used as or part of a system, allows for a very flexible method of operation. For example, a first use is a method illustrated in FIG. 6 where the device or a system with the device or equipped with a multiplexer/demultiplexer set is used to convert a plurality of parallel inputs from instrumentation 61 to 65 to a serial bus such as, for example, a CAN bus 36. The method includes the steps of collecting 201 a plurality of parallel inputs at a first multiplexer/converter, converting 202 the plurality of parallel inputs into a single serial bus output, and transmitting 203 using a first transceiver of the serial bus output to a serial-bus, a local area network protocol, a personal area network protocol, a low power digital radio protocol, or an hypertext transfer protocol either over a hardwire or a wireless connection.

The method can also include the steps of receiving 204 at a second multiplexer/converter the serial bus output or any other data stream from the inputs and converting 205 the single serial bus output back to multiple parallel inputs. In one contemplated embodiment, the step of transmitting 203 the serial bus output includes a step of selecting 210 the mode of transmission based on the existence of a hardwire connection. For example, software programming or hardware programming can create a priority delivery system where the converter/multiplexer 100 observes whether the SNA or any other hardwire port for an Ethernet cable or an optical fiber connection is connected to a receiving box, which is in turn connected to a CAN bus. In that case, the cable will be used and the wireless emitter and the local CAN-bus will not be enabled. Alternatively, if there is no cable connecting a multiplexer from a demultiplexer, a secondary connection will be enabled, namely, the wireless connector. Finally, if the multiplexer is connected locally to a CAN bus, the SNA and wireless connections may be powered down.

Further, different converters/multiplexers 100 will have different identifiers to allow for network grouping. For example, a very large system can have three different converters/multiplexers 100 at different locations, each sending a different data stream upstream to a single converter/multiplexer 100 device. In that case, the receiving converter/multiplexer 100 can process the different data streams as regular inputs 31, 32, 33, 34, and 35 and then convert them back into a single serial bus stream for better processing. One of ordinary skill in the art of data processing will understand the permutations that may be created by using different devices 100 as part of an overall system or apparatus.

In one alternate embodiment, the multiple parallel inputs 206, 207 are further converted by the first multiplexer/converter or a second demultiplexer/converter into other formats using set drivers or templates. In yet another embodiment, the first multiplexer/converter and the second multiplexer/converter are hardware and a wireless connection for the transmission step and the method of use further includes the step of selecting the mode of transmission based on a programmed default configuration.

Input Cabling Logic

The current disclosure describes a system, apparatus, and device used to help with cabling of different instrumentation found on a single large system. Other advantages ensue from using a multiplexer/converter aside from those described above. For example, each different input 31, 32, 33, 34, and 35 can be viewed as part of a larger group of inputs associated with a single large system having a predetermined configuration. A truck having two back lights, a trailer weight, and a sensor for the position of a back door can be equipped with four different sensors using analog or digital technology with a selected voltage. Illustratively, the back light sensors may be digital 0-5V, while the weight may be analog 0-24V to help increase the precision of the measure, and the back door sensor can be connected to a GPS device to turn on the GPS locator only when the truck is moving and the door is closed. In this contemplated configuration, the memory of the multiplexer/controller may be programmed and stored in the device. In this example, a second multiplexer/controller box may be used in the front of a truck. Several different inputs are to be expected, each based on the different truck model in a family of vehicles to be connected using this technology.

As a result of placing stored, preprogrammed configurations in the controller/multiplexer, as an operator connects the different inputs one by one into the device, the system can be programmed to anticipate other inputs, control the effective level of each input, and even help guide operators during the phases of installation. In the above example, as both back lights are digital 0-5V, when an input having a 0-12V range is connected, the system can be made to recognize the variance and prompt the user as to the new input. The user may also be asked by the system to validate the type of use before cabling of inputs begins. In the above example, by cabling a 0-12V input after a first 0-5V has been entered, the system can launch a secondary search to recognize a different configuration automatically. The user can then be asked if the new input is the second back light, and if so, be told that the range of voltage is outside the expected values and the operator should initiate verification. Or the system can recognize a different known use, such as a different type of truck where four back lights are to be cabled and where two lights are 0-5V and two lights are 0-12V. In that last scenario, the operator can be asked to validate the new choice of vehicle.

Figure 7:
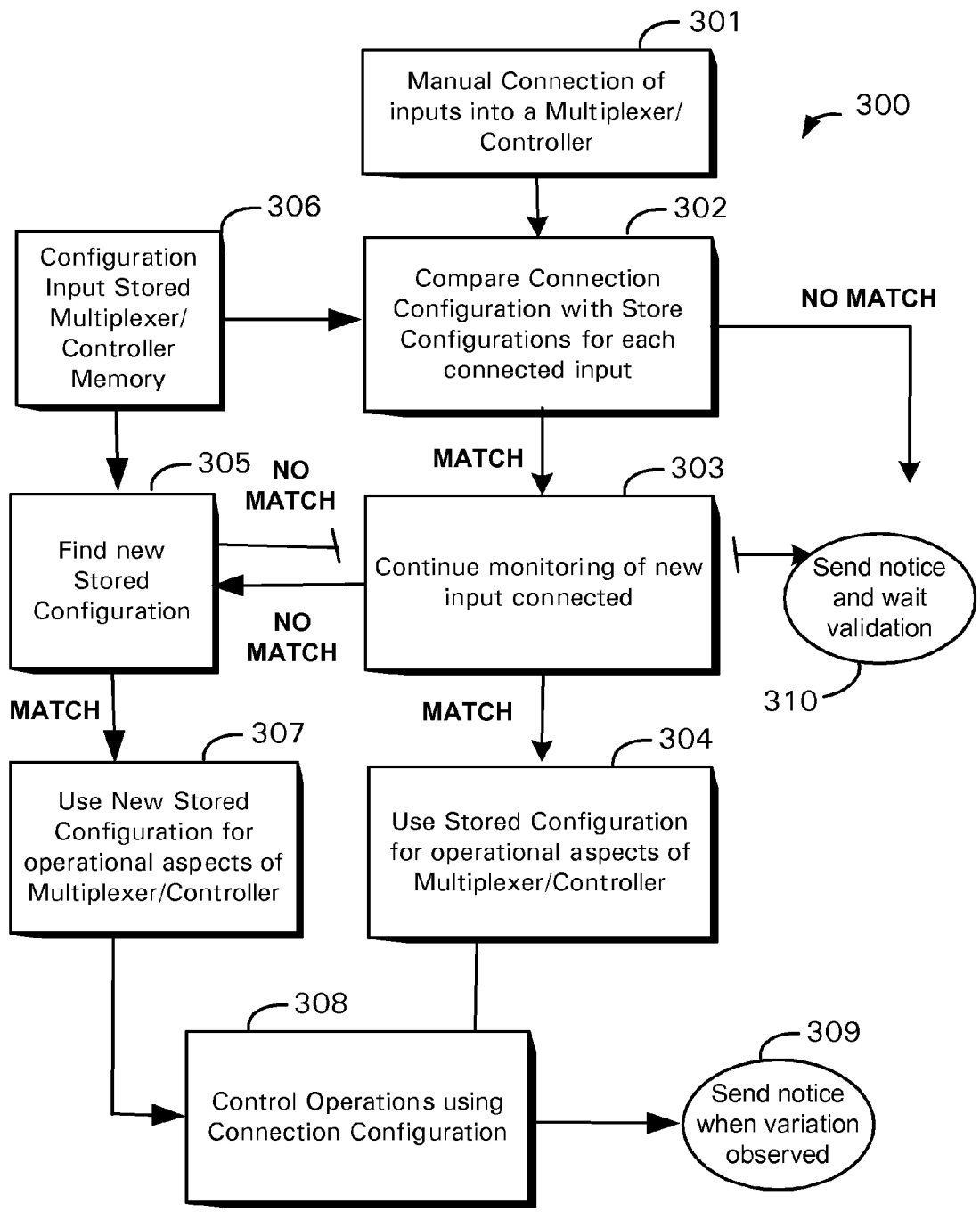
FIG. 7 is a method for management of multiple inputs at a multiplexer according to an embodiment of the present disclosure.

Another advantage of having predetermined, stored configurations associated with the inputs is to allow for control and monitoring of the entire set of sensors at the multiplexer level. For example, using the GPS entry, the system can be programmed to send a high-priority error message once a value falls outside of a range or the signal is lost. One possible method of operation is shown in FIG. 7. In this method, notices are sent to users using configurations stored in the converter/multiplexer 100.

What is describe is a method 300 of advance notification of cabling of a multiplexer/controller 100 converting a plurality of parallel inputs 31, 32, 33, 34, 35 to a serial bus, the method comprising the steps of uploading 306 in a memory of a host processor a plurality of predetermined configurations each for a set of inputs associated with a different configuration, connecting 301 a new input into a multiplexer/controller converting a plurality of parallel inputs to a serial bus, and comparing the input configuration 302 with the plurality of predetermined configurations. If a match is found, the method also can include the step of continued 303 monitoring the connection of new inputs into the multiplexer/controller until all inputs are connected and a match is validated and used 304 as a stored configuration for the operational aspects of the multiplexer/controller.

In another embodiment, the stored configuration is further used 308 to control operations using connections configurations and for sending a notice 309 when a variation from the stored configuration is observed. In yet another embodiment, if at least one input is not in conformity with the stored configuration, a notice is sent to a user that an improper input connection is used. The notice 310, 209 can include cabling guidelines and monitoring as the user continues to connect new inputs to the multiplexer/controller, wherein the plurality of predetermined configurations is a voltage map for each of the different inputs to be cabled in any configuration. Further, upload of the predetermined configurations or notices sent are exchanged via a Global Positioning System or a modem connected to the multiplexer/controller.

Finally, every different instrumentation 61, 62, 63, 64, and 65 operates with an internal clock that can shift over time. These clocks found in different parts of the system can conflict and create problems in the network of information. The clock 123 of the can controller 122 can be connected to a real-time clock (RTC) that relays real time to the system removing the need for each of the different instruments 61 to 65 to have an individual clock. RCT information can be sent to the converters/multiplexers 100 via the GPS or the MODEM and can be merged into the system to coordinate the different inputs 31, 32, and 33 and serve as general clock for the entire system. By removing each individual clocks, the overall efficiency of the system increases and the information is streamlined. The converter 100 can include a real-time clock (RTC) for regulating the central processing unit 70 as shown at FIG. 5 and the inputs 31, 32, and 33.

It is understood by one of ordinary skill in the art that these steps and the apparatus and system disclosed herein correspond to the general steps and elements associated with the practice of this method and the use of the system and apparatus. Those of ordinary skill in the art appreciate that, although the teachings of the disclosure have been illustrated in connection with certain embodiments and method, there is no intent to limit the invention to such embodiments and method. On the contrary, this application is intended to cover all modifications and embodiments falling fairly within the scope of the teachings of the disclosure.

What is claimed is:

1. A converter for multiplexing multiple inputs to a plurality of buses, the converter comprising:
    a central processing unit connected to at least two inputs for receiving parallel data from each of the at least two inputs;
    at least a first transceiver connected to the central processing unit for merging the at least two serial inputs into a first serial output format to a serial bus; and
    at least a second transceiver connected to the central processing unit for merging the at least two serial inputs into a second serial output format to a CAN bus.

2. The converter of claim 1, further comprising a third transceiver connected to the central processing unit for merging the at least two serial inputs into a third serial output format to either a wireless antenna or a SNA connector, for transmitting the serial output via a wireless protocol.

3. The converter of claim 2, wherein the transmission over the serial output is for an optical cable, or an Ethernet over twisted cable.

4. The converter of claim 1, further comprising a third transceiver for transmitting the serial output of the third transceiver over a protocol taken from a group consisting of a local area network protocol, a personal area network protocol, a low-power digital radio protocol, and a hypertext transfer protocol.

5. The converter of claim 2, wherein the first transceiver is a first UART with asynchronous input/output connected serially with a microtransceiver with auto shutdown, the second transceiver is a CAN transceiver, and the third transceiver is a low-power transceiver.

6. The converter of claim 5, wherein the low-power transceiver transmits the serial output over a high-level communication protocol using small, low-power digital radios based on the IEEE 802.15.4 standard.

7. The converter of claim 1, wherein the inputs are selected from a group consisting of an analog input, a digital input, a frequency input, modem data, or GPS data.

8. The converter of claim 1, wherein the inputs are at least one analog input and at least one digital input.

9. The converter of claim 1, further comprising a real-time clock for regulating the central processing unit and the inputs.

* * * * *